UNITED STATES PATENT OFFICE.

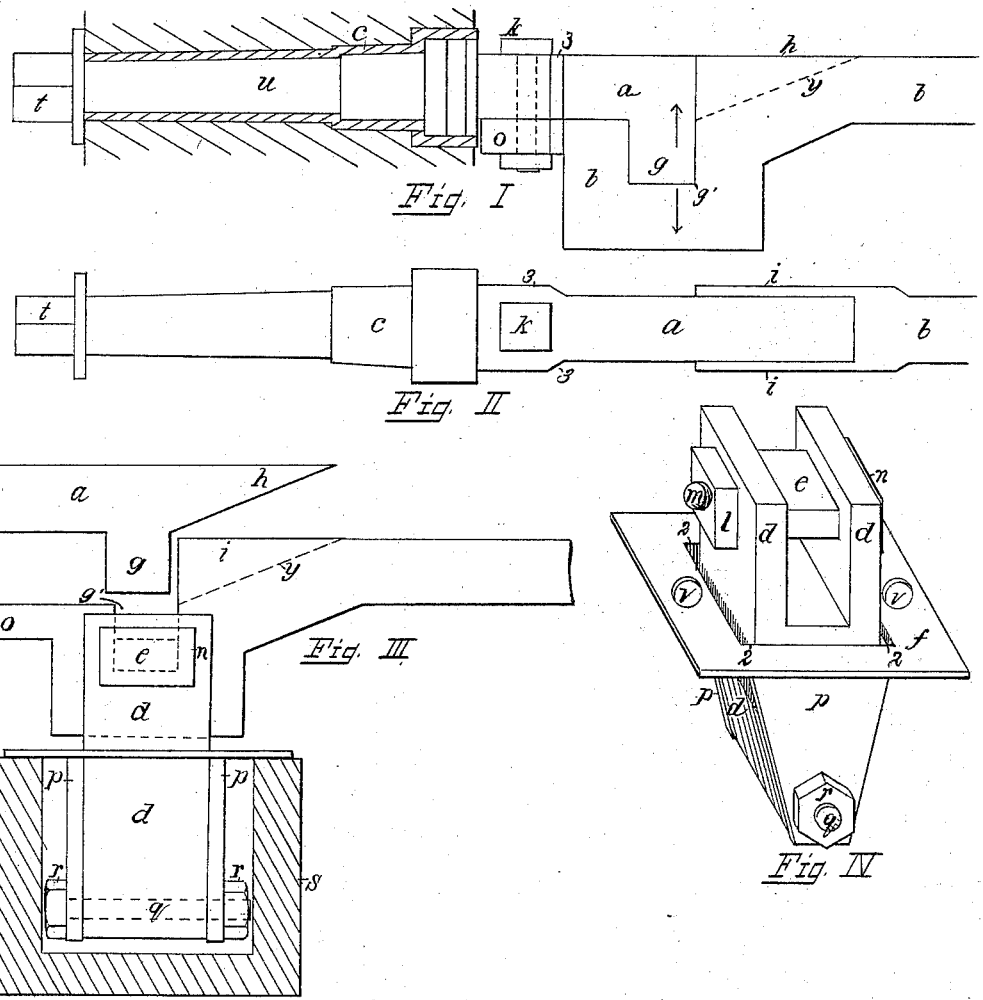

HARVEY HADDEN, OF PEEKSKILL, NEW YORK, ASSIGNOR OF ONE-HALF TO WILLIAM W. HOYT, OF SAME PLACE.

SEPARABLE WAGON-AXLE.

SPECIFICATION forming part of Letters Patent No. 533,416, dated January 29, 1895.

Application filed November 26, 1894. Serial No. 529,899. (No model.)

*To all whom it may concern:*

Be it known that I, HARVEY HADDEN, a citizen of the United States, and a resident of Peekskill, in the county of Westchester and State of New York, have invented certain new and useful Separable Wagon-Axles, of which the following is a specification.

My invention relates to wagon axles, and its object is to admit of a ready and quick transfer of a wagon body from wheels to sled runners, and also to facilitate and cheapen the repairing of broken axles. These objects are attained by the means herein described and set forth in the accompanying drawings, in which like letters and numerals refer to similar parts in the several views.

Figure I represents an end of a wagon axle with my invention attached. Fig. II is a top view of the same. Fig. III illustrates the removal of the wheel end of the axle, and how the axle is attached to a sled runner. Fig. IV represents a device to be attached to a sled runner for the attachment of the axle to the runner.

In Fig. I $b, b, o$, represent a shape to be given to the ends of any metallic wagon axle. $c'$ is a portion of a wheel hub; $c$, the metal box commonly inserted in wheel hubs.

$u$ represents the axle bearing within the box $c$, having a nut $t$ on its outer end. The extension $a$, integral with the part $u$, completes the parts of the detachable end of the axle.

The part $a$ has a projection $g$ which enters the notch $g'$ in the depressed end of the axle $b$, and also a tapering end $h$ which fills the space between the flanges $i, i$, on the axle $b$ as shown in Figs. I and II.

The two parts, $a$ and $b$, are made to fit snugly together so they cannot be separated except by moving them in the directions of the arrows in Fig. I. It will be observed that a strain in any other direction (within the limits of probabilities) cannot produce any yielding of the joint.

A bolt $k$ inserted through the part $a$ and the end $o$ of the part $b$ will effectually secure the two parts together. As will be seen in Figs. I and II both parts of the axle are spread, as at 3, 3, where the bolt $k$ passes through them. The object is to compensate for the metal removed for the bolt.

As axles usually break at the inner end of the wheel bearing, repairs are possible with this device without removing the axle from the wagon.

Fig. IV represents a device adapted to take the place of the part $u, a$, of the axle, when sled runners are to be substituted for the wheels.

$f$ is a frame to be secured to the framing of a sled runner, as in Fig. III, $s$ representing the runner frame. Flanges $p, p$, of the frame $f$ support by a pivoting bolt $q$ a forked bearing $d$. The forked end of this bearing is adapted to receive the notched end of the axle as shown in Fig. III, and the axle is so held by means of the bolt $e$ which fits the notch $g'$ in the axle. The bolt $e$ has a head $n$ on one end, while the other end is reduced to bolt form $m$, and receives a nut $l$ as in Fig. IV. This bearing $d$ is thus securely held to the axle while the runner will be allowed room for longitudinal vibration by reason of the spaces 2, 2, between the bearing $d$ and frame $f$, Fig. IV.

Having described my invention, what I claim, and desire to secure by Letters Patent of the United States, is—

1. The combination, substantially as herein shown, of an axle in separable parts, part $b$ provided with flanges $i, i$, notch $g$, and enlarged extension $o$, and part $a$ having an extension $h$ to fit between flanges $i, i$, and an extension $g$ to fit notch $g'$, and an enlarged portion to receive a bolt, and bolt $k$.

2. In combination with an axle as described, a sled attachment consisting of a frame $f$, support $d$ pivoted in said frame and having a notch to receive the end of the axle, and bolt $e$ to secure said axle in place, substantially as described.

3. The combination substantially as shown of the notched axle end, sled runner $s$, frame $f$ and support $d$.

Signed at Peekskill, in the county of Westchester and State of New York, this 21st day of November, A. D. 1894.

HARVEY HADDEN.

Witnesses:
STEPHEN LENT,
STEPHEN H. LENT.